United States Patent
Keiner et al.

(10) Patent No.: US 9,687,138 B2
(45) Date of Patent: *Jun. 27, 2017

(54) APPARATUS FOR INTRODUCING SCALE REMOVER TO A DISHWASHER

(71) Applicants: Frederick Keiner, Ozark, MO (US); Patricia Keiner, Ozark, MO (US)

(72) Inventors: Frederick Keiner, Ozark, MO (US); Patricia Keiner, Ozark, MO (US)

(*) Notice: Subject to any disclaimer, the term of this patent is extended or adjusted under 35 U.S.C. 154(b) by 0 days.

This patent is subject to a terminal disclaimer.

(21) Appl. No.: 14/589,785

(22) Filed: Jan. 5, 2015

(65) Prior Publication Data

US 2016/0192819 A1    Jul. 7, 2016

(51) Int. Cl.
| | | |
|---|---|---|
| *A47L 15/42* | (2006.01) | |
| *C02F 5/08* | (2006.01) | |
| *D06F 39/00* | (2006.01) | |
| *C02F 1/68* | (2006.01) | |

(52) U.S. Cl.
CPC ............ *A47L 15/4231* (2013.01); *C02F 5/08* (2013.01); *D06F 39/007* (2013.01); *C02F 1/686* (2013.01); *C02F 2303/22* (2013.01); *C02F 2307/12* (2013.01)

(58) Field of Classification Search
CPC .......... B08B 3/00; C02F 5/08; C02F 2303/22; C02F 1/686; C02F 2307/12; A47L 15/4231; D06F 39/007
See application file for complete search history.

(56) References Cited

U.S. PATENT DOCUMENTS

| | | | |
|---|---|---|---|
| 4,509,543 A * | 4/1985 | Livingston | .......... A47L 15/4293 134/113 |
| 5,176,297 A | 1/1993 | Mooney | |
| 6,106,771 A | 8/2000 | Fitton | |
| 2005/0022314 A1 | 2/2005 | Ambuter | |
| 2006/0185697 A1 | 8/2006 | Andriola | |
| 2008/0308127 A1* | 12/2008 | Padtberg | ............. A47L 15/0057 134/18 |
| 2011/0126861 A1 | 6/2011 | Dorigo | |
| 2013/0048028 A1 | 2/2013 | Morin | |
| 2013/0130358 A1 | 5/2013 | Davanzo | |
| 2013/0192642 A1 | 8/2013 | Beshears | |

* cited by examiner

*Primary Examiner* — Michael Barr
*Assistant Examiner* — Benjamin L Osterhout
(74) *Attorney, Agent, or Firm* — The Law Office of Jerry D. Haynes

(57) ABSTRACT

An apparatus for introducing scale remover to a dishwasher for enabling a descaling or cleaning agent to the introduced to a dishwasher and its conduits in a manner which optimized cleaning efficacy is configured to be connected to a conventional dishwasher between the dishwasher and its water input line. A diverter having an output that is connected to the dishwasher's input conduit combines the conventional water input conduit from the water input line and a container output conduit connected to a fluid container containing a conventional descaling solution. In use, a user would actuate the apparatus for introducing scale remover to a dishwasher to cause descaling solution in the fluid container to be directed into the dishwasher input conduit and the dishwasher. Once empty, a water shut off valve controlling the water input line is opened and the dishwasher is turned on to run a normal cleaning cycle.

1 Claim, 1 Drawing Sheet

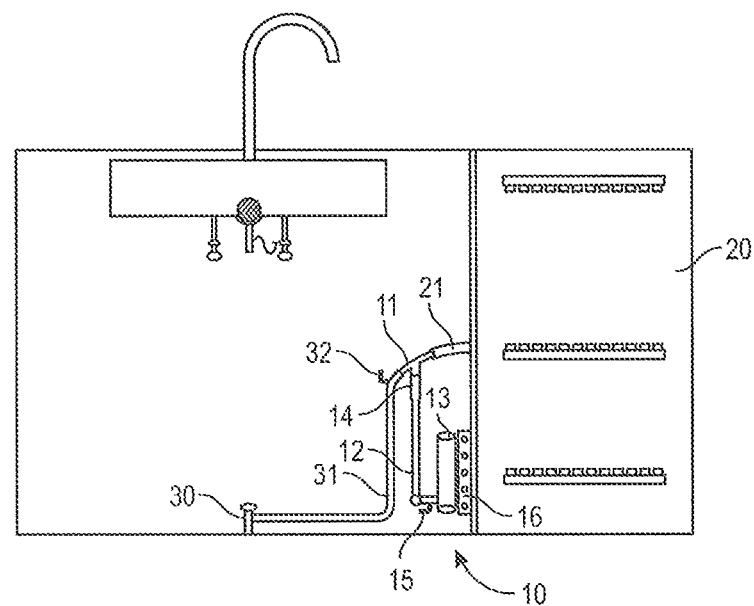

APPARATUS FOR INTRODUCING SCALE REMOVER TO A DISHWASHER

CROSS REFERENCE TO RELATED APPLICATIONS

This application claims the benefit of and incorporates by reference co-pending U.S. non-provisional patent application Ser. No. 14/504,608 filed Oct. 2, 2014.

BACKGROUND OF THE INVENTION

Field of the Invention

This invention relates generally to appliance cleaning apparatus and, more particularly, to an apparatus for introducing a scale removing substance for removing mineral deposits, such as calcium carbonate (or "limescale"), from a water using appliance, particularly a dishwasher.

Description of the Prior Art

The use of conventional dishwashers (or "dishwashing machines"), as mechanical device for cleaning dishes and eating utensils is well known. Mechanical dishwashers typically cleans by spraying hot water at the dishes and circulated water and detergent by a pump. Through ordinary use of conventional dishwashers, however, mineral deposits from the water used often build up in its conduits, such as pipes and valves, generally resulting in a decrease of efficiency and efficacy of the dishwashers. As mineral deposits typically cannot be removed by merely flushing the conduits with water, common methods of eliminating the problem in washing machines often include removing or replacing pipes. While the general use of descaling agents is known, it is often difficult to properly introduce them to the pipes and valves used by a dishwashers to enable optimal efficacy A problem which still exists, therefore, is that conventional dishwashing machines, through their ordinary operation, are not configured for enabling effective removal of mineral deposits. Thus, there remains a need for an apparatus for introducing scale remover to a dishwasher which would facilitate the introduction of a cleaning agent into a dishwasher through its conventional water input line so as to optimize cleaning action. It would be helpful if such an apparatus for introducing scale remover to a dishwasher defined a structure that could be integral with the dishwasher or installed aftermarket. It would be additionally desirable for such an apparatus for introducing scale remover to a dishwasher to selectively dispense its cleaning solution through gravitational action, prior to the operating cycle of the dishwasher.

The Applicant's invention described herein provides for an apparatus for introducing scale remover to a dishwasher adapted to allow the effective removal of scale from the surfaces and pipes of a dishwasher. The primary components in Applicant's apparatus for introducing scale remover to a dishwasher are a fluid container, a check valve, a diverter, and connection hosing. When in operation, the apparatus for introducing scale remover to a dishwasher enables the introduction of an effective amount of liquid scale removing fluid into a dishwasher through its normal water intake connections as opposed to directly into its cleaning area. As a result, many of the limitations imposed by prior art structures are removed.

SUMMARY OF THE INVENTION

An apparatus for introducing scale remover to a dishwasher for enabling a descaling or cleaning agent to the introduced to a dishwasher and its conduits in a manner which optimized cleaning efficacy. The apparatus for introducing scale remover to a dishwasher is configured to be connected to a conventional dishwasher between the dishwasher and its water input line. A diverter having an output that is connected to the dishwasher's input conduit is used to combine the conventional water input conduit from the water input line and a container output conduit that is connected to a fluid container containing a conventional descaling solution. In use, a user would actuate the apparatus for introducing scale remover to a dishwasher to cause descaling solution in the fluid container to be directed into the dishwasher input conduit and the dishwasher. Once empty, a water shut off valve controlling the water input line is opened and the dishwasher is turned on to run a normal cleaning cycle.

It is an object of this invention to provide an apparatus for introducing scale remover to a dishwasher which would facilitate the introduction of a cleaning agent into a dishwasher through its conventional water input line so as to optimize cleaning action.

It is another object of this invention to provide an apparatus for introducing scale remover to a dishwasher that could be integral with the dishwasher or installed aftermarket.

It is yet another object of this invention to provide an apparatus for introducing scale remover to a dishwasher that selectively dispenses its cleaning solution through gravitational action, prior to the operating cycle of the dishwasher.

These and other objects will be apparent to one of skill in the art.

BRIEF DESCRIPTION OF THE DRAWINGS

The Figure is a front plan view of an apparatus for introducing scale remover to a dishwasher built in accordance with the preferred embodiment of the present invention connected to a dishwasher.

DETAILED DESCRIPTION OF THE INVENTION

Referring now to the drawings and in particular the Figure, an apparatus for introducing scale remover to a dishwasher 10 is shown connected to a conventional dishwasher 20 between the dishwasher and a water input line 30 of the dishwasher 20. In a conventional arrangement, the water input line 30 is connected to the dishwasher 20 with a hose or other conduit, thereby allowing water from a conventional water heater or other source to be directed, by way of the water input line 30, to the dishwasher 20.

When the apparatus for introducing scale remover to a dishwasher 10 is in use with the dishwasher, a water source conduit 31 from the water input line 30 is connected to a diverter 11 having an output that is connected to the dishwasher input conduit 21. Also connected to the diverter 11 is a container output conduit 12 that is connected to a fluid container 13. The fluid container 13 is where a conventional descaling solution, such as CLR® Calcium, Lime & Rust Remover, is stored and dispensed from. The diverter 11 is thereby configured to combine fluids in the water source conduit 31 with fluids in the container output conduit 12 when fluids from both lines are available and direct them into the dishwasher input conduit 21.

Right before it connects to the diverter 11, the container output conduit 12 includes a check valve 14 which allows fluid to only pass through it moving from the fluid container 13 side to the diverter 11 side, thereby preventing water or other liquid passing through the diverter from backwashing into the container output conduit 12 or the fluid container 13.

Additionally provided on the container conduit line 12, substantially adjacent to where it connects to the fluid container 13 is a container shut off valve 15 that allows the container output conduit 12 to be selectively opened and closed. It is contemplated that the fluid container 13 and the container output conduit 12 are configured with the container output conduit 12 exiting the fluid container 13 at or near its bottom so as to allow fluid to be dispensed from the fluid container 13 solely by action of gravity when the container shut off valve 15 is moved to an open position. Accordingly, in the illustrated embodiment, a mounting plate 16 is employed to hold the fluid container 13 upright in a position adjacent to the dishwasher 20. It is contemplated, however, that in alternate embodiments the fluid container 30 may be integrated into the dishwasher 20 and/or operative to dispense fluid through a pump.

In the preferred embodiment, the water source conduit 31 additionally includes a water shut off valve 32 disposed therein before the water source conduit 31 connects to the diverter 11, thereby allowing the water source conduit 31 to be selectively opened and closed.

In use, it is contemplated that the normal operation of the dishwasher would occur with the container shut off valve 15 closed and the water shut off valve 32. To clean limescale from the dishwasher and its related conduits, a user would operate the apparatus for introducing scale remover to a dishwasher 10 by closing the water shut off valve 32 and opening the container shut off valve 15 to cause descaling solution in the fluid container to be directed into the dishwasher input conduit 21 and the dishwasher. Once empty, the water shut off valve 32 is opened and the dishwasher is turned on to run a normal cleaning cycle. Once the first cycle is completed, a second cycle is then run to remove all of the descaling solution from the unit.

It is understood that the first cycle and second cycle would be run with the dishwasher substantially empty of dishes to be cleaned in a typical cleaning cycle.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. A method for introducing scale remover to a dishwasher, comprising the steps of:
providing a fluid container having a bottom and connected to an agent fluid line at a position adjacent to the bottom, thereby configuring the fluid container to dispense a liquid descaling agent into the agent fluid line solely by operation of gravity;
integrating said fluid container to a dishwasher having an dishwasher input conduit and a water fluid line associated therewith, wherein said dishwasher input conduit is operative to direct liquid from the exterior of the dishwasher to the interior of the dishwasher and said water fluid line is operative to supply liquid from a water input source to the dishwasher input conduit;
wherein the step of integrating is performed by connecting a diverter to the water fluid line, dishwasher input conduit, and the agent fluid line such that said diverter is configured to direct liquid from the water fluid line into the dishwasher by way of the dishwasher input conduit and liquid from the from the agent fluid line into the dishwasher by way of the dishwasher input conduit;
closing a water shut off valve associated with said water fluid line, thereby restricting the flow of fluid from the water fluid line into the dishwasher input conduit and with the water shut off valve closed, opening a container shut off valve associated with the agent fluid line, thereby causing the liquid descaling agent in the fluid container to dispense into the agent fluid line, through the diverter and dishwasher input conduit, and into the dishwasher.

* * * * *